(12) United States Patent
Nagatani et al.

(10) Patent No.: US 7,685,794 B2
(45) Date of Patent: Mar. 30, 2010

(54) APPARATUS FOR STERILIZATION AND FILLING OF CUP TYPE CONTAINER

(75) Inventors: Nobuaki Nagatani, Yokohama (JP);
Yoshinori Asada, Yokohama (JP);
Takeshi Iwashita, Yokohama (JP);
Shoichi Inaba, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 370 days.

(21) Appl. No.: 11/662,497

(22) PCT Filed: Sep. 13, 2005

(86) PCT No.: PCT/JP2005/016852

§ 371 (c)(1),
(2), (4) Date: Mar. 12, 2007

(87) PCT Pub. No.: WO2006/030790

PCT Pub. Date: Mar. 23, 2006

(65) Prior Publication Data

US 2007/0266677 A1    Nov. 22, 2007

(30) Foreign Application Priority Data

Sep. 14, 2004    (JP) .............................. 2004-267287

(51) Int. Cl.
*B65B 55/02* (2006.01)

(52) U.S. Cl. .......................... 53/425; 53/426; 53/111 R; 53/266.1

(58) Field of Classification Search ................. 53/167, 53/266, 382, 426, 425, 266.1, 281, 282; 422/26–28, 422/302–304
See application file for complete search history.

(56) References Cited

U.S. PATENT DOCUMENTS 4,409,775 A * 10/1983 Brody et al. ................. 53/167

5,377,475 A * 1/1995 Haarer et al. ................ 53/167
6,475,435 B1 * 11/2002 Taggart ........................ 422/33
7,162,848 B2 * 1/2007 Jacobs et al. ................. 53/167

FOREIGN PATENT DOCUMENTS

| JP | 55-110555 A | 8/1980 |
|---|---|---|
| JP | 60-99828 A | 6/1985 |
| JP | 60-123328 A | 7/1985 |
| JP | 61-145721 U | 9/1986 |

(Continued)

OTHER PUBLICATIONS

International Search Report of PCT/JP2005/016852, date of mailing Dec. 20, 2005.

*Primary Examiner*—Hemant M Desai
(74) *Attorney, Agent, or Firm*—Westerman, Hattori, Daniels & Adrian, LLP (57) ABSTRACT

Cup-shaped containers can be turned over and transferred with good stability from a sterilization-washing zone to the filling-sealing zone inside an aseptic chamber, and admixture of odor or microorganisms is prevented.

The first conveyor 2 for conveying the cup-shaped container 38 in an inverted state and a second conveyor 3 for conveying the container in an upright state downstream of the first conveyor 2 are disposed in series in substantially the same plane inside a continuous aseptic chamber 1. A container supply device, a container sterilization device, and a container washing device are disposed successively along the first conveyor 2. A contents filling device 40, a lid material sealing device 41, and a device for discharging the sealed cup-shaped container are installed successively along the second conveyor 3. Sterilization and washing are performed in an inverted state, while conveying the container with the first conveyor 2. The washed container is turned over and transferred from the first conveyor to the second conveyor 3 and the contents filling and lid sealing are performed on the second conveyor.

8 Claims, 5 Drawing Sheets

FOREIGN PATENT DOCUMENTS

| | | |
|---|---|---|
| JP | 62-28326 A | 2/1987 |
| JP | 6-32331 A | 2/1994 |
| JP | 9-58633 A | 3/1997 |
| JP | 2000-62730 A | 2/2000 |
| JP | 2000-128141 A | 5/2000 |
| JP | 2004-10076 A | 1/2004 |

* cited by examiner

MOVEMENT DIRECTION

Fig. 5

APPARATUS FOR STERILIZATION AND FILLING OF CUP TYPE CONTAINER

TECHNICAL FIELD

The present invention relates to sterilization and filling of containers with a large mouth section such as cups and trays with a contents such as foods, and more particularly to a sterilization and filling method and apparatus for cup-shaped containers that are filled aseptically and to a beverage sealed in a cup-shaped container that is manufactured with the apparatus.

BACKGROUND ART

In an aseptic filling line in which the contents is sealed in an aseptic state, a container sterilization process, a container washing process, a filling process, a lid material sterilization process and washing process, and a sealing process are required and these processes are conducted in an aseptic chamber. As the conventional aseptic filling apparatus, a sterilization apparatus is known in which sealed containers are discharged outside a chamber via a sterilization process in which one conveyor is disposed in one aseptic chamber, containers are supplied in an upright state to the conveyor, and a sterilization liquid is sprayed onto the containers conveyed in the upright state, a process of drying with heated aseptic air, a contents filling process, and a process of sealing with a lid material (ref. Patent Document 1). However, in order to perform the operations of sterilizing to filling the container during conveying with one conveyor in one chamber, the containers have to be conveyed in the upright state from the very beginning. Therefore, in the process of washing with washing water, the washing water that remained inside the container cannot be removed. As a result, washing cannot be performed and it is necessary to rely on sterilization with a volatile sterilization agent such as hydrogen peroxide that can be removed by hot-air drying. However, in this case the sprayed amount of the sterilization agent has to be very small to enable the reliable removal of the sterilization agent within a short time, the sterilization efficiency is limited, a restriction is placed on the type of contents that can be employed, and in the case of beverages such as low-acidic that can be easily spoiled, the manufactured products have to be distributed in a chilled state. Yet another problem is that if the process from sterilization to sealing of a container is performed in one chamber, droplets and odor of the sterilization agent in the sterilization-drying zone of the sterilized container diffuse to the filling-sealing zone and adhere to the contents.

Aseptic filling apparatuses have been suggested in which, in order to resolve this problem, the chamber is divided in two, sterilization and washing are enabled in the initial chamber by conveying the containers in an inverted state, in the next chamber, the containers are filled with the contents and sealed, while being conveyed in an upright state, reliable sterilization and washing are enabled with a sufficient amount of sterilization agent and washing water in the sterilization and washing processes, and diffusion of droplets or odor of the sterilization agent to the contents filling process is prevented (ref. Patent Documents 2 and 3). In the apparatuses of Patent Documents 2 and 3, a container sterilization chamber is disposed in front of an aseptic chamber where filling of the contents and sealing of the container are performed, and the container discharge port of the container sterilization chamber is connected to the aseptic chamber via a vertical chute, whereby air-tight linking to the aseptic chamber is ensured and the inside of the container sterilization chamber is maintained under a positive pressure with the aseptic air in the same manner as the aseptic chamber. The sterilized container from which the sterilization liquid has been removed is turned over while being thereafter conveyed to the location immediately above the discharge port, assumes a posture with a mouth section facing upward, and is transferred to the aseptic chamber via the chute, while maintaining such a posture.

Patent Document 1:
    Japanese Published Patent Application No. 55-110555
Patent Document 2:
    Japanese Published Patent Application No. 60-99828
Patent Document 3:
    Japanese published Patent Application No. 60-123328

DISCLOSURE OF THE INVENTION

Problem to be Solved by the Invention

However, with the system in which the container is caused to fall down via a chute from the sterilization chamber into the aseptic chamber, as described in Patent Documents 1 and 2, the air pressure in the aseptic chamber is increased over that in the sterilization chamber so as to prevent the air containing sterilization agent located in the sterilization chamber from flowing into the aseptic chamber. As a result, in the case of lightweight cup-shaped containers such as containers made from a synthetic resin, the conveying becomes unstable and the containers cannot be supplied in a stable posture to the conveyor located in the aseptic chamber. Furthermore, the aseptic chamber comprises a large number of open sections such as a container supply port, a lid material supply port, a discharge port for sealed containers, and a discharge port for the lid material, thereby creating conditions under which the external air can easily penetrate into the aseptic chamber. The conventional systems comprise no means sufficient to prevent the external air from penetrating from those open sections into the aseptic chamber and a high level of sterilization was difficult to maintain inside the aseptic chamber. Furthermore, the problem arising when cup-shaped containers are made from polyester resins such as PET (polyethylene terephthalate) that has been widely used in recent years is that in the sterilization performed with an aqueous solution of hydrogen peroxide in the container sterilization process, hydrogen peroxide is easily adsorbed on the container surface and the container is easily thermally deformed by heating. Furthermore, with the beverages that were conventionally sealed in cups by the above-described aseptic filling process, for the reasons described above, it is difficult to ensure a high level of sterilization at which the number of remaining living bacteria is less than one in one million and also to ensure the reduction of the remaining amount of the sterilizing agent. Moreover, it is important that the filling environment be sterilized to the same level as the containers and that aseptic conditions after sterilization be ensured and maintained, but although the conventional filling apparatuses adapted to chilled distribution have been adapted to simple environment sterilization, they cannot be sterilized and maintained in an aseptic state at the same level as the containers and are not suitable for products that can be distributed at normal temperature.

Accordingly, the present invention resolves the above-described problems inherent to the conventional apparatuses for aseptic filling of cup-shaped containers, and it is an object of the present invention to provide a sterilization and filling method for cup-shaped containers by which sterilization, washing, filling, and sealing of the container can be performed inside one chamber, sufficient sterilization effect can be obtained, droplets and odor of the sterilization agent and washing water can be prevented from diffusing to the contents filling process, even lightweight containers can be returned from the inverted state into the upright state with good stability and conveyed in the upright state to the filling process, the risk of thermal deformation and odor adhesion is prevented even in the case of cup-shaped containers made from a synthetic resin such as a polyester resin, reliable sterilization can be performed, and aseptic conditions of the aseptic chamber can be reliably maintained, and also to provide a apparatus for implementing the method, and a beverage sealed in a cup-shaped container that can be distributed at normal temperature even if it is a low-acidity beverage that can be easily spoiled.

Means for Solving Problem

The sterilizing and filling method for a cup-shaped container in accordance with the present invention that resolves the above-described problems comprises conveying the container from a container sterilization process to a container washing process and conveying the container from a filling process to a sealing process with respectively different conveyors disposed in series in substantially the same plane inside an integrated chamber, conveying the container in an inverted state from the container sterilization process to the container washing process, performing container sterilization and washing while conveying the container in the inverted state with the conveyor, making the cup-shaped container after completion of washing to assume an upright state when being transferred between the conveyors, and conveying the container to the filling process. The sterilization of the cup-shaped container is performed by spraying a sterilization agent on at least the inner surface of the container in the inverted state, and the washing of the cup-shaped container is performed by spraying aseptic water on at least the inner surface of the container in the inverted state. The method can be applied as an aseptic filling method by using the chamber in the form of an aseptic chamber inside which a positive pressure is created with aseptic air.

The aseptic chamber has a supply port for the cup-shaped container, a discharge port for the filled and sealed cup-shaped container, a supply port for a lid material, and a discharge port for a lid material skeleton and also has a supply port for aseptic air and a main air discharge port, wherein a preliminary pressure zone is provided before the main air discharge port and partitioned by a partition wall from the main chamber of the aseptic chamber, and the flow direction of air inside the chamber is controlled by controlling the pressure so that an air pressure $P_1$ of the preliminary pressure zone is less than an air pressure $P_0$ in the main chamber of the aseptic chamber and higher than an external air pressure $P_3$ and the relationship $P_0>P_1>P_3$ is satisfied. As a result, the permeation of external air into the chamber can be effective prevented, the flow of air inside the chamber can be controlled to so that the air flows toward the preliminary pressure zone, and the air of the container sterilization and washing processes can be prevented from flowing to the filling and sealing processes. The chamber is partitioned in a transition site between the different conveyors into a sterilization-washing zone and a filling-sealing zone, and an air pressure $P_{0-1}$ of the filling-sealing zone is made higher than an air pressure $P_{0-2}$ of the sterilization-washing zone. As a result, splash of washing water from the sterilization zone and washing zone and the flow of sterilization agent odor into the filling-sealing zone can be prevented more effectively.

The container sterilization zone and container washing zone where the container sterilization and washing processes are implemented and partitioned with partition means that allows the air to circulate therethrough and prevents the circulation of liquid in the predetermined direction, and a sterilization liquid or washing liquid flying in the container sterilization zone and container washing zone is prevented from scattering to other zones, while allowing the circulation of air. As a result, the air pressure in the chamber can be controlled, while preventing the droplets generated in the container sterilization zone and container washing zone from flying to other zones. Furthermore, by performing sterilization of cup-shaped containers made from a polyester resin by spraying a peracetic acid solution on at least the inner surface of the container in an inverted state, adhesion of odor to the container and thermal deformation of the container that were observed in the conventional processes are prevented and the sterilization can be performed effectively.

By supplying the containers into the chamber by receiving the containers from a container stacker with a container supply rotor disposed in the supply port for the cup-shape container and turning the container over and supplying onto the conveyor that conveys the containers in the chamber in an inverted state, while preventing the outflow of air inside the chamber from the container supply port, the air containing the sterilization agent and located inside the chamber can be prevented from flowing out to the outside of the chamber.

In the sterilizing and filling apparatus for a cup-shaped container in accordance with the present invention that serves to implement the above-described sterilizing and filling method, a first conveyor for conveying the cup-shaped container in an inverted state and a second conveyor for conveying the cup-shaped container fitted in an upright state downstream of the first conveyor are disposed in series in substantially the same plane inside an integrated chamber, a container supply device, a container sterilization device, and a container washing device are disposed successively along the first conveyor, thereby forming a container supply zone, a container sterilization zone, and a container washing zone in order from the upstream side, a contents filling device, a lid material sealing device, and a device for discharging the sealed cup-shaped container are installed successively along the second conveyor, thereby forming a contents filling zone, a lid material sealing zone, and a sealed container discharge zone in order from the upstream side, the first conveyor is a conveyor having a receiving stand for receiving the container in an inverted state, the second conveyor is a conveyor having a container receiving stand having formed therein a container fitting port for receiving the container in an upright state, and the container is transferred in a turned-over state to the second conveyor by transferring the container between the conveyors in a state where the container is turned sidewise in the end section on the downstream side of the first conveyor and transferred to the container fitting port of the second conveyor, whereby the container is transferred to the second conveyor in the turned-over state.

The chamber is an aseptic chamber inside which a positive pressure is created with aseptic air, has a supply port for the cup-shaped container, a discharge port for the filled and sealed cup-shaped container, a supply port for a lid material, and a discharge port for a lid material skeleton, and also has a supply port for aseptic air and a main air discharge port, wherein the upstream side of the container supply zone inside the aseptic chamber is partitioned by a partition wall having a passage port through which the first conveyor passes, whereby a preliminary pressure zone is formed, and the main discharge port is formed in the preliminary pressure zone. As a result, the air of the container sterilization and washing zone can be effectively prevented from flowing to the filling and sealing line and the inflow of air into the aseptic chamber can be prevented. The container sterilization zone and the container washing zone where the container sterilization process and container washing process are performed are partitioned with partition means that allows the air to circulate therethrough and prevents the circulation of liquid in the predetermined direction, and a sterilization liquid or washing liquid flying in the container sterilization zone and container washing zone is prevented from scattering to other zones. A blind-shaped partition in which inclined plates that are inclined downward toward the respective zone are disposed with the predetermined spacing is preferably used as a specific partition means.

By employing a configuration in which the container supply device comprises a container supply chamber formed in the upper wall of the aseptic chamber, a container supply stacker disposed at the upper wall of the container supply chamber, and a container supply rotor that is disposed in the container supply chamber, receives the container from the container stacker and turns the container over, and supplies the container on the first conveyor located inside the aseptic chamber, wherein the container supply rotor comprises one or a plurality of container fitting pockets in the outer peripheral section of a cylindrical rod-shaped rotor and the outer peripheral surface thereof is disposed so as to be in circumferential contact with an upper open section of the container supply chamber and an opening edge of the container supply port of the aseptic chamber, whereby the air inside the aseptic chamber is prevented from flowing out from the container supply port, the outflow of air in the aseptic chamber through the container supply port can be effectively prevented. By employing a configuration in which the lid material sterilization zone and lid material washing zone are connected to the aseptic chamber, the lid material sterilization zone and lid material washing zone are partitioned by a partition wall having the lid material passage holes formed therein, and each zone can be controlled to an air pressure different from the air pressure inside the aseptic chamber, the outflow of air in the aseptic chamber through the lid material passage hole can be minimized.

By employing a configuration of the reception stand of the first conveyor that has an opening section for being inserted with a flange of the cup-shaped container, has a plurality of protrusions that protrude in the radial direction for supporting the flange of the container inside the open section, and has at least one support pin that extends in the height direction of the container to support the container when the container is turned sideways, the container can be conveyed and transferred with good stability, the contact surface area of the holding stand with the container can be minimized and the container can be sterilized and washed with good efficiency. Employing a configuration in which the chamber is partitioned into a sterilization-washing zone and a filling-sealing zone with a partition wall having an opening through which the container passes in the transition site between the first conveyor and second conveyor, and the air pressure of the filling-sealing zone is higher than the air pressure of the sterilization-washing zone is preferred because the splash or odor of the washing water during sterilization and washing of the container can be effectively prevented from flowing into the filling-sealing zone. Furthermore, by employing a configuration in which a container discharge pressure regulation chamber is provided at the upper wall of the aseptic chamber in the vicinity of the downstream end section of the second conveyor, the container discharge pressure regulation chamber and the aseptic chamber are linked via a container discharge port through which the container can pass, and the air pressure inside the container discharge pressure regulation chamber and the aseptic chamber can be regulated independently, it is possible to control the air flow inside the aseptic chamber.

The beverage sealed in a cap-shaped container in accordance with the present invention that resolves the above-described problems is manufactured by conveying the container from a container sterilization process to a container washing process and conveying the container from a filling process to a sealing process with respectively different conveyors disposed in series in substantially the same plane inside an aseptic chamber in which a positive pressure is created with aseptic air, conveying the cup-shaped container in an inverted state from the container sterilization step to the container washing step, performing sterilization by spraying a sterilization agent on at least the inner surface of the cup-shaped container, performing washing by spraying aseptic water on the inner surface, transferring the cup-shaped container after completion of washing to the outer conveyor so that the container assumes an upright state, filling a beverage on the conveyor, sealing the cup-shaped container with a sterilized and washed lid material, and controlling the flow of air pressure inside the aseptic chamber from the filling-sealing zone to the sterilization-washing zone, whereby distribution at the normal-temperature is possible after sealing. The beverage sealed in a cap-shaped container can be distributed at normal temperature even when the beverage is a low-acidity beverage that can be spoiled comparatively easily.

EFFECT OF THE INVENTION

With the sterilization and filling method and apparatus for cup-shaped containers in accordance with the present invention, conveying the container from a container sterilization process to a container washing process and conveying the container from a filling process to a sealing process are performed with respectively different conveyors disposed in series in substantially the same plane inside an integrated chamber and the conversion and transfer from the inverted state to the upright state are performed inside the chamber under the same pressure. Therefore, the sterilized containers can be transferred with good stability to the conveyor of the filling and sealing line located in the sealed chamber, even when lightweight cup-shaped containers are used. Furthermore, because the sterilization and washing are performed in an inverted state of the containers, reliable sterilization can be performed without the danger of the sterilization agent remaining in the container even when the sprayed quantity of the sterilization agent is large. By providing a preliminary pressure zone in front of the main air discharge port, decreasing the air pressure of the preliminary pressure zone to below that in the chamber and above the external gas pressure, thereby controlling the direction of air flow inside the chamber, the penetration of the external air into the chamber can be effectively prevented. Furthermore, although the container sterilization zone and container washing zone are provided in the same chamber as the filling and sealing zone, because the air flow can be directed toward the preliminary pressure zone, droplets or odor of the sterilization agent do not diffuse to the filling zone and adhesion thereof to the contents is prevented.

By partitioning the container sterilization zone and container washing zone where the container sterilization process and container washing process are implemented with a blind-type partition, a uniform air pressure can be maintained inside the chamber, while preventing the liquids scattered in the container sterilization zone and container washing zone from being scattered to the other zones and the containers can be transported with good stability even if a container is omitted. In particular, when the container is conveyed in an inverted state, because it is conveyed by merely engaging the flange portion of the container, by contrast with conveying in the upright state when the container is fitted with a retainer, a lightweight container can become unstable due to air flow turbulence, but when the zones are partitioned in the above-described manner with a blind-type partition, the air flow turbulence is small, whereby a significant positive effect is produced on stable conveying of the containers. Furthermore, when the cup-shaped containers are made from a polyester resin such as PET, by spraying a peracetic acid solution on at least the inner surface of the container in an inverted state, the effective sterilization can be conducted without the risk of causing the adhesion of odor to the containers or thermal deformation of the container as in the conventional systems.

In the sterilization apparatus in accordance with the present invention, the first conveyor and second conveyor are disposed in the same chamber. Therefore, the apparatus structure can be simplified. In particular, the mechanism for reversing the cup-shaped container from the inverted state into the upright state can be greatly simplified by comparison with the conventional mechanisms, the sterilization of the apparatus is facilitated, and the structure is advantageous for maintaining the most significant level of washing in the aseptic sterilization structure.

Further, configuring the container supply device is effective in reducing the outflow of air in the aseptic chamber and containing the sterilization agent odor to the outside through the container supply port. Moreover, by employing a configuration in which the lid material sterilization zone and lid material washing zone can be controlled to an air pressure different from the air pressure inside the aseptic chamber, the outflow of air contained in the aseptic chamber through the lid material passage hole can be minimized and the inside of the aseptic chamber can be maintained efficiently in an aseptic state. Further, by employing a configuration in which a container discharge pressure regulation chamber is provided and the air pressure inside the container discharge pressure regulation chamber and aseptic chamber can be controlled independently, it is possible to minimize the outflow of air contained inside the aseptic chamber through a port for discharging the containers into the aseptic chamber and to control the flow direction of the air inside the aseptic chamber. By controlling the air pressure in each zone, from the air pressure inside the aseptic chamber to the external air pressure, in a stepwise matter with the aforementioned pressure regulation functions, the aseptic level of the aseptic chamber can be reliably maintained and flow direction of air inside the chamber can be controlled. Furthermore, the outflow of air from the aseptic chamber can be minimized and the amount of aseptic air that has to be supplied to maintain the positive pressure can be reduced. Further, by partitioning the chamber with the partition wall in the transfer site between the first conveyor and second conveyor, the droplets or odor of the sterilization agent can be effectively prevented from penetrating from the sterilization-washing zone into the filling-sealing zone and a better aseptically filled product can be obtained. The above-described sterilization and filling method and apparatus of the cup-shaped container in accordance with the present invention are not limited to aseptic filling and are also applicable to chilled filling, hot packing, and the like, but the most desirable application thereof is for aseptic filling. The beverage sealed in a cup-shaped container that is obtained with the aseptic filling method in accordance with the present invention enables filling and sealing with a high degree of sterilization even when the beverage sealed in the cup-shaped container is a beverage that can be easily spoiled, such as a low-acidity beverage, that conventionally required chilled distribution. Therefore, after the production, the multiplication of bacteria is prevented over a long period even at normal temperature, normal-temperature distribution is possible, and distribution cost can be reduced.

BRIEF DESCRIPTION OF THE DRAWINGS

FIG. 4-A is a plan view of the holding stand of the first conveyor, FIG. 4-B is a side view thereof.

EXPLANATIONS OF LETTERS OR NUMERALS 1. aseptic chamber
1A. main chamber of the aseptic chamber
2. first conveyor
3. second conveyor
4. holder
5. holder
6. guide
7. container supply device
8. sprocket
9. container supply zone
10. container sterilization zone
11. container washing zone
12. container water draining zone
13. upper wall
14. container supply chamber
15. upper wall of container supply chamber
16. stacker
17. container supply rotor
18. container fitting pocket
20. sterilization agent spraying nozzle
21. washing nozzle
22. sterilization agent reception pan
23. washing water reception pan
24. sterilization agent reservoir
25. washing water reservoir
26. shielding plate
27. bottom wall
28. upstream end wall
30. preliminary pressure zone
31. aseptic water spraying nozzle
32. aseptic air spraying nozzle
33. open section
34. protrusion
$35_{1-4}$. blind-type partition
36. inclined plate
38. container
40. contents filling device
$41_{1-4}$. lid material sealing device
43. container discharge pressure regulation chamber
45. lid material sterilization chamber
46. lid material washing chamber
47. lid material conveying chamber
48. lid web
49. lid skeleton
50. pressure regulation chamber
51. pressure regulation chamber
52. sterilization agent spraying nozzle
53. washing water spraying nozzle
55. aseptic air supply port
56. main air discharge port -continued

EXPLANATIONS OF LETTERS OR NUMERALS 57. container sterilization and container washing zone discharge port
58. discharge port
59. discharge port
71. partition plate
72. sterilization-washing zone
73. filling-sealing zone
74. passage hole

BEST MODE FOR CARRYING OUT THE INVENTION

The present embodiment of the invention will be described below based on the appended drawings.

Figure 1:
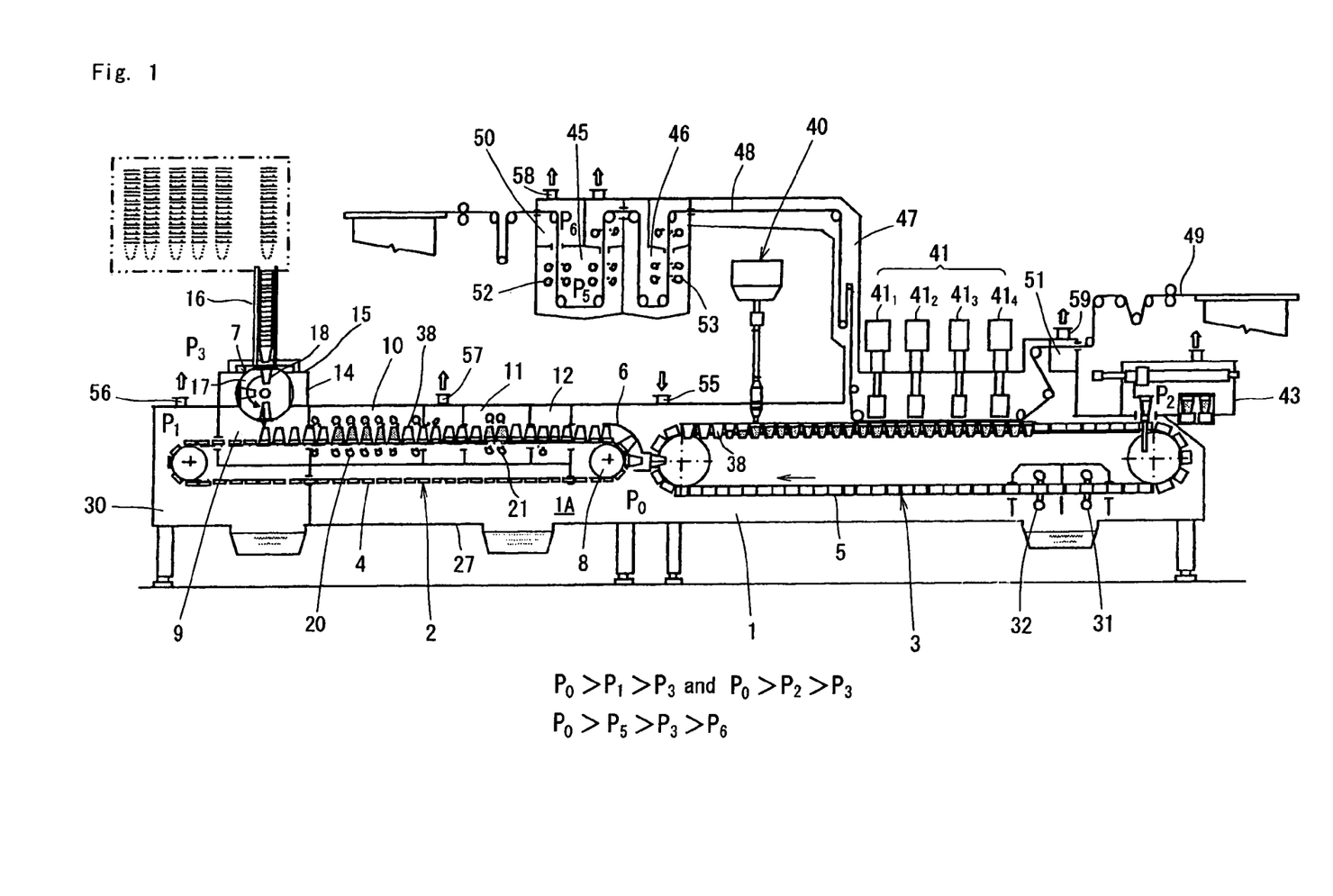
FIG. 1 illustrates schematically the aseptic filling apparatus of an embodiment of the present invention.
Figure 3:
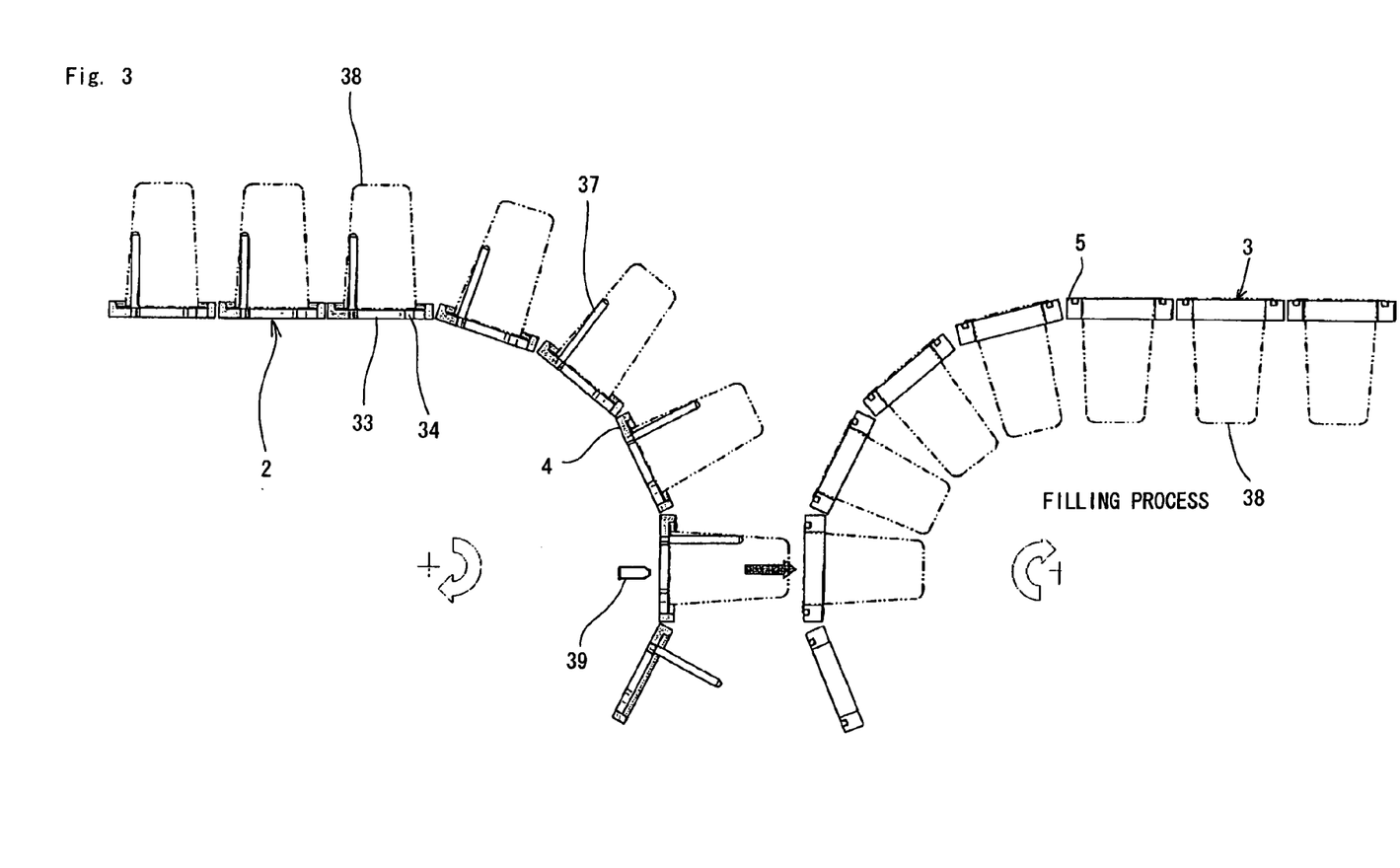
FIG. 3 is an enlarged front view of the main portions of the first conveyor and second conveyor.
Figure 4:
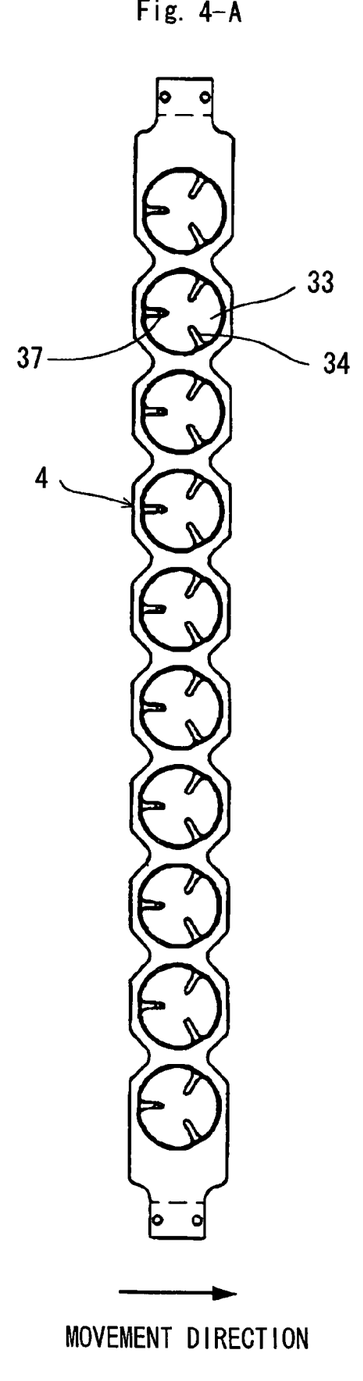

FIG. 1 is a schematic view of an aseptic filling line of cup-shaped containers in accordance with the present invention. In accordance with the present invention, the aseptic filling line as a whole is disposed in one aseptic chamber 1 under a positive pressure. A first conveyor 2 and a second conveyor 3 are disposed sequentially in a row inside the aseptic chamber 1, and the conveyors are synchronously and intermittently rotary driven. The first conveyor 2 serves to convey the cup-shaped containers in an inverted state and has holders 4 for holding the cup-shaped containers in an inverted state arranged with a predetermined pitch between endless strips such as parallel chains. No specific limitation is placed on the structure of the holders 4, provided they enable the spraying of a sterilization agent and washing water on the inner peripheral surface of the containers from the down-facing openings of the containers and can hold the containers so that they are neither toppled nor moved by the spraying pressure and do not fall down when a sidewise state is assumed at the downstream end section of the conveyor. However, it is preferred that the holders have a structure that demonstrates a holding function at the least possible contact surface area of the container holder and container, so that the sterilization agent and washing water come into contact with the entire inner peripheral surface of the container. The holder 4 can be configured to be capable of holding one container, but from the standpoint of productivity it is preferred to have a plurality of container holders disposed in the transverse direction with a predetermined spacing so as to process simultaneously a plurality of containers. In the present embodiment, as shown in FIG. 3 and FIG. 4, the holder 4 has a total of 10 open sections 33 for mating with the flange section of the container and the flange section of the container is mated with and supported by the open section 33, thereby making it possible to spray a sterilization agent or the like from the lower surface side of the conveyor into the container during transportation thereof and sterilize the inside of the container. In the open section 33, a plurality of protrusions 34 (in the present embodiment, three protrusions with a 120° spacing) for supporting the container flange are provided in a condition of protruding radially from the inner peripheral surface, and a pin 37 is provided so as to protrude in the height direction of the container from the distal end of the protrusion 34 positioned on the rear side in the container conveying direction, from among those protrusions 34. The pin, as shown in FIG. 3, serves to support the container when it assumes a sidewise state as far as the point of transfer to the second conveyor in the downstream end section of the first conveyor and prevent the container from falling down from the holder. It is preferred that the distal end of the pin be in contact in a position higher than the position of the center of gravity of the container. As described herein above, in the present embodiment, the surface area of contact with the container is minimized and the occurrence of sterilization leak is prevented merely by supporting a cup by three protrusions 34 and bringing the distal end section of the pin 37 into contact with the inner peripheral surface of the container. Furthermore, setting the height from the protrusion 34 to the top surface of the holder 4 to the prescribed depth, for example, about 3 mm makes it possible to lift the cup by 1 to 2 mm by the spraying pressure during spraying of the sterilization agent and washing water, thereby ensuring reliable sterilization and washing even of the contact surface of the flange and protrusions.

The second conveyor 3 serves to transport the cup-shaped containers 38 (referred to hereinbelow simply as "container") in an upright state. Similarly to the first conveyor, the second conveyor comprises holders 5 for holding the containers 38, those holders being arranged with a predetermined pitch between endless strips such as parallel chains. As shown in FIG. 3, the holder 5 of the second conveyor has a hole for mating with the barrel section of the container in the upright state and a locking surface for locking the flange section or curl section of the container on the outer periphery of the orifice. The conventional conveyor for conveying cup-shaped containers can be employed for the second conveyor.

The movement of the container in the transfer zone of the first conveyor 2 and second conveyor 3 is performed in a state where the container is turned through 90° so that the container conveyed in an inverted state can be turned and transferred to an upright state. For this purpose a guide 6 in the form of a circular arc for guiding the bottom section of the container is disposed between a pair of sprockets 8 at the downstream end section of the first conveyor 2, so that the cup held by the holder 4 can be conveyed to a 90° state. Furthermore, a high-pressure air spray nozzle 39 is disposed on the inner side so as to eject high-pressure aseptic air in the direction of the holder 5 of the second conveyor 3 facing the container at the same time as the container reaches the position in which it is inclined through 90°, as shown in the figure, to move the container so that it assumes an upright state in the container mating hole of the holder 5, and to eject the container 38 from the holder 4 along the axial center in the conveying direction.

Other appropriate means for transferring the container from the first conveyor 2 to the second conveyor 3 can be also used. For example, by contrast with the above-described means, the container can be sucked in at the second conveyor 3, or mechanically pushed from the first conveyor 2, or transferred by an actuator for linear movement, but in the case of the present invention, because the cup-shaped container is simply moved linearly from the left side to the right side, as shown in the figure, it is possible to use a much simpler means, such as a high-pressure air spray nozzle, than the conventional turn-over devices and the container can be turned over and transferred in a simple manner.

In the conveying route of the first conveyor 2, a container supply device 7, a container sterilization device, and a container washing device are disposed in the order of description from the upstream side, and the locations of the respective devices are considered as a container supply zone 9, container sterilization zone 10, and container washing zone 11. In FIG. 1, a container water draining zone 12 is provided downstream of the container washing zone, but a drying zone may be provided instead of the water draining zone.

The container supply device 7 comprises a container supply chamber 14 formed in an upper wall 13 of the aseptic chamber 1, a container supply stacker 16 disposed at the upper wall 15 of the container supply chamber, and a container supply rotor 17 disposed in the container supply chamber and serving to receive the containers from the container stacker 16, turn them upside down, and supply on the first conveyor 2. The container supply rotor 17 comprises one or a plurality (four in the embodiment illustrated by the figure) of container mating pockets 18 in the outer peripheral section of a cylindrical rod-like rotor and the container supply rotor is disposed so that the outer peripheral surface of the container mating pocket 18 comes into contact with the opening edge of the upper open section of the container supply chamber 14 and open section of the upper wall of the aseptic chamber 1, whereby the air located in the aseptic chamber is prevented from flowing from the container supply port to the outside.

In the container sterilization zone 10, a plurality of sterilization agent spraying nozzles 20 for spraying a sterilization agent inside and outside the container are disposed with an appropriate spacing on the conveying side of the bottom section of the container and on the container opening side inside the conveyor. A peracetic acid solution with a high sterilization capacity can be used as the sterilization agent. Usually, when containers are sterilized in an upright state, a very small amount of hydrogen peroxide is atomized, followed by heating and removing the hydrogen peroxide. However, in this case, the sterilization capacity is limited. Furthermore, when PET containers are used, there is a risk of the hydrogen peroxide adhering to the container or the container being thermally deformed.

In accordance with the present invention, because the containers are sterilized and washed in an inverted state, reliable washing and removal can be performed even if a large amount of the sterilization agent is sprayed and a high sterilization effect can be obtained in combination with a peracetic acid solution. Furthermore, since removal by heating is unnecessary, no problems are encountered even when PET containers are used.

In the container washing zone 11, in order to remove the sterilization agent from the inner and outer surfaces of the sterilized container and to wash the container, a plurality of washing nozzles 21 that spray aseptic water are disposed with an appropriate spacing on the conveying side of the bottom section of the container and on the container opening side inside the conveyor, in the same manner as in the container sterilization zone.

Figure 2:
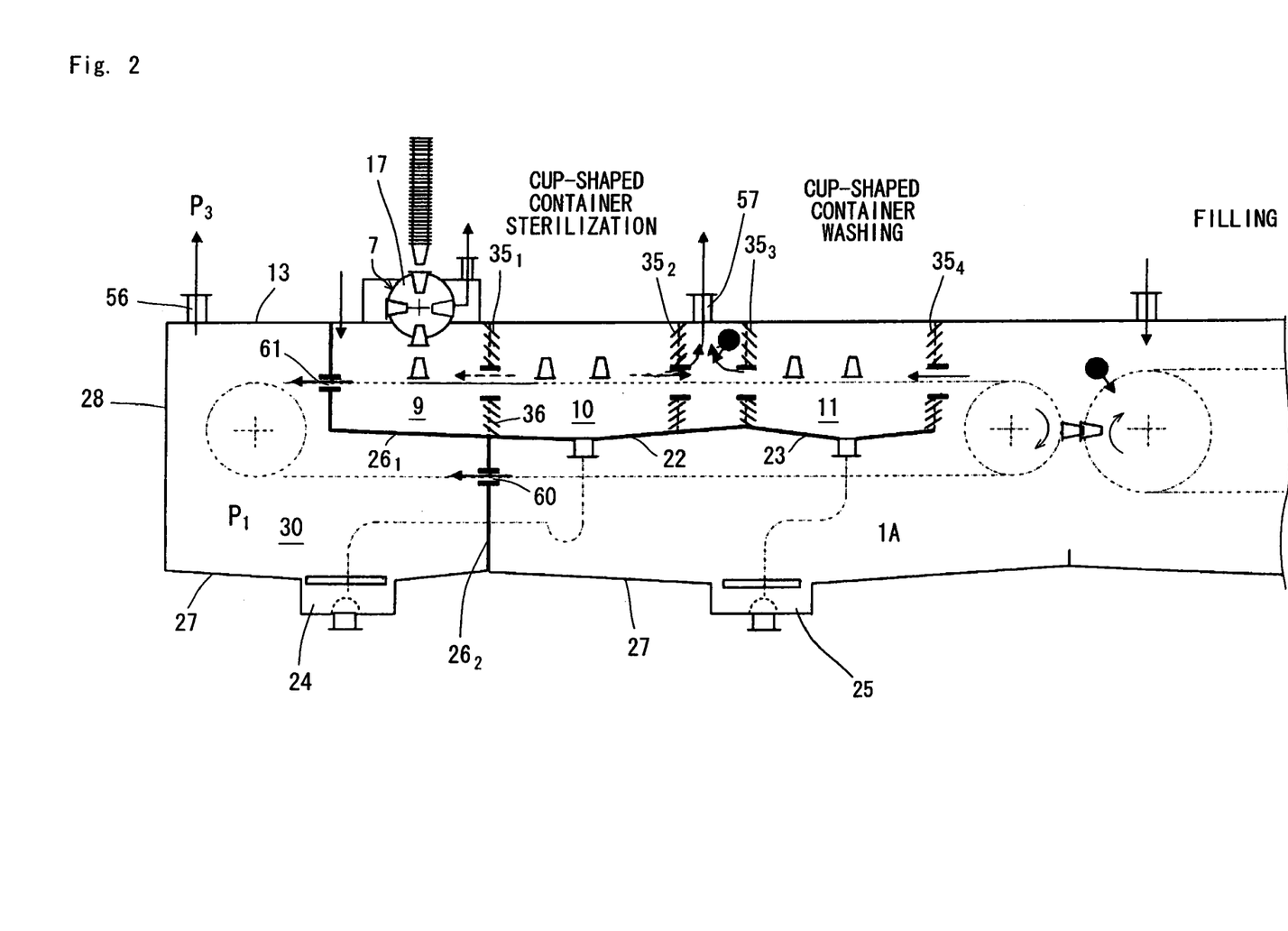
FIG. 2 illustrates schematically the container sterilization zone and container washing zone disposed on the first conveyor in the aseptic filling apparatus of FIG. 1.

Furthermore, below the container sterilization zone 10, as shown in FIG. 2, a sterilization agent reception pan 22 for receiving the sprayed sterilization agent is disposed, and below the container washing zone 11, a washing water reception pan 23 for receiving the washing water is disposed inside the closed loop of the conveyor. The sterilization agent and washing water received by the pans are accumulated in a sterilization agent reservoir 24 and washing water reservoir 25, respectively, and reused or discarded. The sterilization agent reception pan 22 and washing water reception pan 23 also function as partition plates for partitioning those zones from other zones. The upstream end section of the sterilization agent reception pan 22 is connected to a shielding plate $26_1$ disposed below the container supply zone 9, the shielding plate $26_1$ is folded, has a hole allowing the first conveyor to pass, and is connected to the upper wall 13 of the aseptic chamber 1. Further, a shielding plate $26_2$ connected to a bottom wall 27 of the aseptic chamber 1 is connected to the bottom surface of the sterilization agent reception pan 22 or shielding plate $26_1$. The shielding plate $26_2$ is also provided with a hole that allows the passage of the first conveyor 2. Therefore, a preliminary pressure zone 30 bounded by the shielding plates $26_1$, $26_2$, upper wall 13 of the aseptic chamber, upstream end wall 28, bottom wall 27, and both side walls is formed upstream of the aseptic chamber. The object and functions of the preliminary pressure zone 30 will be described below.

As shown in FIG. 2, a partition means for partitioning the container sterilization zone 10 and container washing zone 11 is disposed between the upper surface of the sterilization agent reception pan 22 and washing water reception pan 23 and the upper wall 13 of the aseptic chamber. The partition means is provided to prevent the sterilization agent and washing water used in the zones from being spattered into other zones. However, in accordance with the present invention, as will be described below, although the partition means is provided, in order to control the aseptic chamber, with the exception of the preliminary pressure zone 30, to the same internal pressure, the flow of air should not be obstructed. In order to meet this requirement, in the present embodiment, blind-type partitions $35_1$ to $35_4$ configured by disposing the inclined plates 36 (inclined downward toward the inner side of each zone) with the predetermined spacing are provided in pairs both downstream and upstream of the container sterilization zone 10 and container washing zone 11 as the partition means. Passage ports allowing the first conveyor 2 and containers to pass are formed, as shown in the figure, in the blind-type partitions $35_1$ to $35_4$. As described above, in the blind-type partitions $35_1$ to $35_4$, the inclined plates are inclined downward on the inside of each zone. Therefore, even if the liquid scattered in each zone falls on the partition, the scattered liquid flows down along the inclined plates inside the zone and is prevented from being scattered to the other zones. Because gaps are present between the inclined plates, the air can freely flow therethrough and the zones can be controlled so as to be maintained at almost the same pressure. The opening surface area of the air passages between the inclined plates is selected such that the pressure variation between the zones is very small even when a container is omitted on the holder of the first conveyor.

On the other hand, in the conveying path of the second conveyor 3, a contents filling device 40 and a lid material sealing device 41 are disposed in the order of description from the upstream side in the same manner as in the conventional filling apparatus of this type. If necessary, a gas replacement device and/or a device for adding a liquefied inert gas such as liquid nitrogen can be disposed (they are not shown in the figure). With the lid material sealing device 41, as described hereinbelow, a lid web 48 that was sterilized, washed, and supplied into the aseptic chamber is heat sealed to the open section of the container filled with the contents, then trimming is performed, and the lid material skeleton 49 in which the lids are punched is passed through the below-described pressure regulation chamber 51 and discharged to the outside of the chamber. On the other hand, the sealed containers are discharged to the outside of the chamber via a container discharge pressure regulation chamber 43. In the figure, the reference numeral 31 stands for an aseptic water spraying nozzle for washing the second conveyor and the reference numeral 32 stands for an aseptic air spraying nozzle for water draining. Thus, the second conveyor can be sterilized and washed at all times or at any random time and can be maintained constantly in a clean state even if the contents has adhered thereto in the filling zone.

A lid material sterilization chamber 45 and lid material washing chamber 46 are provided for performing sufficient sterilization treatment of the lid material web 48 supplied to the lid material sealing zone. Here in order to supply the lid material subjected to sterilization and washing treatment into the aseptic chamber, without bringing the lid material into contact with external air, the lid material conveying route 47 leading from the lid material washing chamber 46 to the aseptic chamber is also integrated with the aseptic chamber 1, but the inner pressure control is performed in the below-described manner in order to prevent effectively the air from flowing from the lid material sterilization chamber 45 and lid material washing chamber 46 into the aseptic chamber 1.

The lid material web 48, as shown in FIG. 1 is unwound from a coil (not shown in the figure), passed through the sealed zone inside the aseptic chamber via the lid material sterilization chamber 45, lid material washing chamber 46, and lid material conveying route 47, the containers are sealed, the lid section is then punched out, and the lid material skeleton 49 is discharged to the outside. The lid material sealing device 41 comprises, as shown in the figure, a first-stage sealing means $41_1$, a second-stage sealing means $41_2$, a cooling means $41_3$, and a punching means $41_4$. A sterilization agent spraying nozzle 52 is disposed in the lid material sterilization chamber 45 for spraying a sterilization agent such as an aqueous solution of peracetic acid on both surfaces of the lid material. Furthermore, a washing water spraying nozzle 53 is disposed in the lid material washing chamber 46 for spraying aseptic washing water on both surface of the lid material. The lid material sterilization chamber 45 and lid material washing chamber 46 are partitioned by walls having formed therein the inlet-outlet ports that enable the passage of the lid material web. The pressure inside the two chambers is controlled and the control is so performed that the air present in each chamber does not flow to the downstream stages of the process. Further, in the present embodiment, pressure regulation chambers 50, 51 for performing pressure regulation are provided in the supply port and discharge port for the lid material web so as to prevent the external air from flowing into the aseptic chamber when the lid material web 48 is supplied into the device and discharged therefrom. With the two pressure regulation chambers, the pressure in the chambers can be regulated to a level above the pressure of the aseptic chamber. Respective air discharge ports 58, 59 are provided in the pressure regulation chambers 50, 51, thereby enabling the discharge of air for respective units.

The aseptic chamber 1 has an aseptic air supply port 55 for supplying aseptic air into the chamber and a plurality of air discharge ports for discharging the air present inside the aseptic chamber to the outside and regulating the pressure inside the chamber. The main air discharge port 56 is provided on the upstream end of the container supply zone, thereby preventing the appearance of air flow from the upstream side to the downstream side inside the aseptic chamber, that is, from the container sterilization and container washing zones to the container sealing zone. Furthermore, the container sterilization—container washing zone discharge port 57 for discharging the air of the container sterilization zone and container washing zone to the outside is provided between those zones. As a result, the air containing the odor of the sterilization agent is more reliably prevented from flowing to the downstream side. On the other hand, the aseptic chamber 1 is divided into the preliminary pressure zone 30 and a main chamber 1A of the aseptic chamber having positioned therein the container supply zone, container sterilization zone, container washing zone, and contents filling zone. The preliminary pressure zone 30 is provided in front of the main discharge port 56. In the present embodiment, the preliminary pressure zone is provided adjacently to the upstream side of the container supply zone and linked to the inside of the main chamber 1A of the aseptic chamber via the first conveyor passage hole 60, 61 formed in the shielding plates $26_1$ and $26_2$. In the container supply zone, a certain amount of external air is unavoidably introduced together with the supplied containers, but the introduced external air can be effectively prevented from flowing to the sterilization and washing zones by the flow of air toward the adjacent preliminary pressure zone.

In the aseptic filling apparatus of the present embodiment, which has the above-described configuration, by controlling the pressure of each zone in the aseptic chamber, the penetration of external air is prevented, the air present in the lid material sterilization zone and lid material washing zone is prevented from flowing into the filling zone and sealing zone, although the lid material sterilization zone, lid material washing zone, filling zone, and sealing zone are located inside the aseptic chamber, and the air flow is controlled. Thus, if the air pressure of the main chamber 1A of the aseptic chamber is denoted by $P_0$, the air pressure of the preliminary pressure zone is denoted by $P_1$, the air pressure of the container discharge pressure regulation chamber 43 is denoted by $P_2$, and the external air pressure is denoted by $P_3$, then control is performed so that the air pressures satisfy the following relationships: $P_0 > P_1 > P_3$ and $P_0 > P_2 > P_3$. Therefore, because the entire aseptic chamber is under a positive pressure higher than the external air pressure, the penetration of the external air is prevented and, conversely, the air present inside the chamber flows to the outside via the main air discharge port 56. As a result, inside the chamber, an air flow is generated from the main chamber of the aseptic chamber to the preliminary pressure zone 30 where the main discharge port 56 is present. Therefore, the air of the container sterilization zone flows to the container supply zone through the blind partition $35_1$, reaches the preliminary pressure chamber through the first conveyor passage hole 61 of the shielding plate $26_1$, and is discharged to the outside via the main air discharge port 56, as shown by a broken-line arrow in FIG. 2. Furthermore, because the filled containers are discharged to the outside via the container discharge pressure regulation chamber 43 and the pressure of the container discharge pressure regulation chamber 43 is higher than the external gas pressure, the penetration of the external air in the process of discharging the containers is prevented. Furthermore, because the air located in the vicinity of the downstream end section of the second conveyor flows in the direction of the container discharge pressure regulation chamber 43 and is discharged to the outside, the inside the main chamber of the aseptic chamber can be maintained in a clean aseptic state at all times.

Furthermore, by controlling the air pressure in each zone from the main chamber 1A of the aseptic chamber to the external air in a stepwise manner, the outflow of air from the aseptic chamber can be minimized and the amount of aseptic air that has to be supplied to maintain the positive pressure can be reduced.

Further, the inflow of air from the lid material supply unit to the main chamber 1A of the aseptic chamber is also prevented by performing pressure control so that the air flow is generated from the main chamber 1A of the aseptic chamber in the direction of the lid material sterilization chamber. Thus, the pressure of each chamber is regulated so that the following relationship is satisfied: $P_0 > P_5 > P_3 > P_6$, where the air pressure of the pressure regulation chamber 50 provided in the inlet port of the lid material sterilization chamber is denoted by $P_6$ and the air pressure of the lid material sterilization chamber 45 is denoted by $P_5$. Therefore, because the pressure of the lid material sterilization chamber 45 is lower than that of the main chamber of the aseptic chamber, the inflow of air from those chambers into the main chamber of the aseptic chamber is prevented.

Moreover, because the pressure of the pressure regulation chamber 50 is lower than the external gas pressure, the air containing the sterilization agent of the lid material sterilization chamber 45 can be prevented from flowing to the outside.

Figure 5:
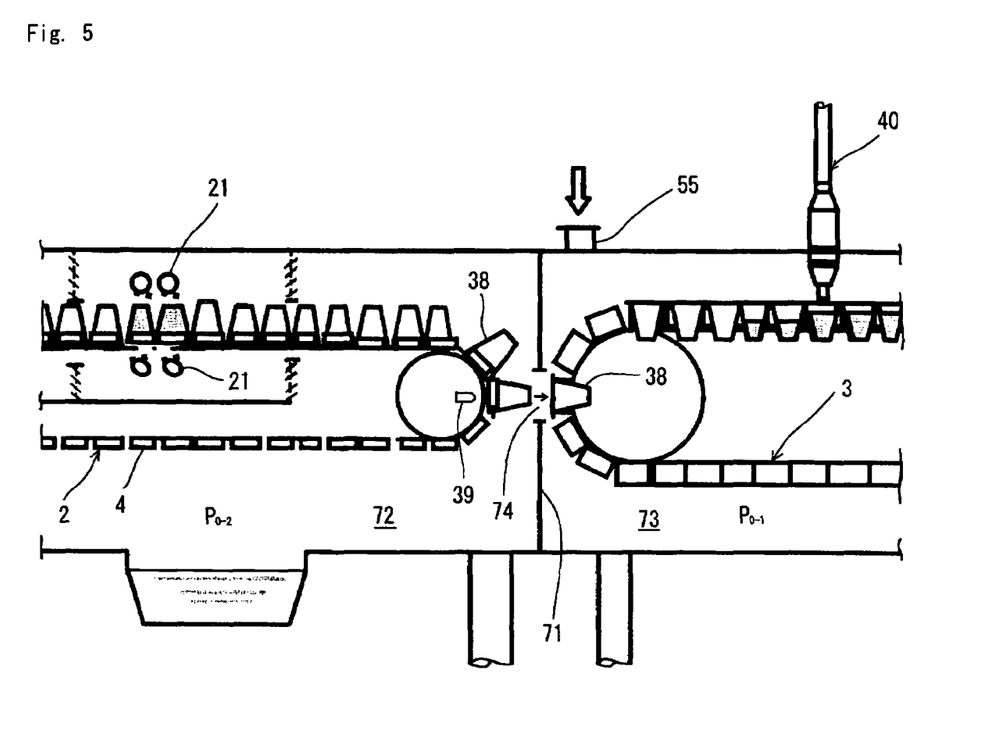
FIG. 5 is a schematic view illustrating the main portion of the aseptic filling apparatus of another embodiment of the present invention.

FIG. 5 illustrates the main components of the aseptic filling apparatus for cup-shaped container of another embodiment of the present invention. In the aseptic filling apparatus for cup-shaped containers of the above-described embodiment, no partitions were present between the first conveyor 2 disposed in the sterilization-washing zones and the second conveyor 3 disposed in the filling-sealing zones, but in the present embodiment, a partition is provided between the first conveyor 2 and second conveyor 3, the main chamber 1A of the aseptic chamber is partitioned into a sterilization-washing zone 72 and a filling-sealing zone 73, the air flow from the filling-sealing zone 73 to the sterilization-washing zone 72 can be controlled more reliably, and the droplets of washing water from the sterilization-washing zone 72 or odor of the sterilization agent can be more reliably prevented from flowing into the filling-sealing zone 73. Because other structural components of the present embodiment are identical to those of the above-described embodiment, the components identical to those of the embodiment illustrated by FIG. 1 and FIG. 2 are assigned with identical symbols and explanation thereof is omitted. In the aseptic filling apparatus for cup-shaped containers of the present embodiment, the partition plate 71 may be disposed above and below with a spacing sufficient to enable the passage of the cup-shaped containers carried from the first conveyor 2 to the second conveyor 3, but one partition plane having formed therein a passage hole 74 corresponding to the cup shape and the position where the cup passes is preferred. Here, the port 55 for supplying aseptic air to the aseptic chamber is provided to as to be positioned in the filling-sealing zone.

In the apparatus of the present embodiment that has the above-described configuration, the flow of the aseptic air is controlled so that the air pressure $P_{0-1}$ of the filling-sealing zone 73 becomes higher than the air pressure $P_{0-2}$ of the sterilization-washing zone 72. For this purpose, it is preferred than $P_{0-1}$ be higher than $P_{0-2}$ by 3 Pa or more. For example, the air pressure $P_{0-1}$ of the filling-sealing zone 73 is set to 20 Pa and the air pressure $P_{0-2}$ of the sterilization-washing zone 72 is set to 15 Pa. By thus making the air pressure $P_{0-1}$ of the filling-sealing zone 73 higher than the air pressure $P_{0-2}$ of the sterilization-washing zone 72, the air can be reliably caused to flow from the filling-sealing zone 73 into the sterilization-washing zone 72, and even if the amount of the sterilization agent used in the sterilization zone to washing zone and the amount of washing water proportional thereto are increased, scattering of the washing water and inflow of odor of the sterilization agent from the sterilization-washing zone 72 into the filling-sealing zone 73 can be reliably prevented and the degree of container sterilization and washing in the sterilization zone to washing zone can be increased over that in the conventional aseptic filling line.

As for the relationship with air pressure in other locations in the filling apparatus for cup-shaped containers of the present embodiment, the control is conducted so that the following relationships are satisfied, in the same manner as in the above-described embodiment:

$P_{0-1} > P_{0-2} > P_1 > P_3$, $P_{0-2} > P_2 > P_3$, and $P_{0-1} > P_{0-2} > P_5 > P_3 > P_6$

EXAMPLE 1

The following tests were performed to confirm the effect of aseptic filling by using the above-described aseptic filling apparatus.

The below-described sample containers were used, cups and lid material having mold adhered thereto were supplied to the aseptic filling apparatus described in the above embodiment, a culture medium was charged under the predetermined conditions, and then the lid material was heat sealed and a sample filled cup product was obtained. The pressure of each chamber in this case was controlled in the below-described manner. The cup product thus obtained was stored for 7 days at a temperature of 30° C. and then turbidity in the culture medium and the flocculation were visually evaluated. The evaluation results demonstrated that no turbidity or flocculation was present in the culture medium and the possibility of manufacturing an aseptic product was confirmed.

1. Sample Container
(1) Sample cup: 200 mL, PET cup (mouth diameter 75 mm, height 108.5 mm).
(2) Sample lid material: web width 1000 mm, punching diameter 82 mm.

2. Culture Medium Used
(1) Standard agar-agar culture medium (Nissui Seiyaku KK)

| | |
|---|---|
| Yeast extract | 2.5 g |
| Peptone | 5 g |
| Grape sugar | 1 g |
| Agar-agar | 15 g |
| Distilled water | 1000 mL |

(2) Usual agar-agar culture medium (Nissui Seiyaku KK)

| | |
|---|---|
| Meat extract | 5 g |
| Peptone | 10 g |
| Sodium chloride | 5 g |
| Agar-agar | 15 g |
| Distilled water | 1000 mL |

(3) Culture medium for spore former cultivation

| | |
|---|---|
| Usual agar-agar culture medium | 35 g |
| Yeast extract | 5 g |
| Manganese sulfate ($MnSO_4 \cdot 5H_2O$) | 50 mg |
| Magnesium sulfate ($MgSO_4 \cdot 7H_2O$) | 500 mg |
| Calcium chloride ($CaCl_2 \cdot 2H_2O$) | 100 mg |
| Distilled water | 1000 mL |

(4) SCD culture medium (Nissui Seiyaku KK)

| | |
|---|---|
| Casein-derived peptone | 17 g |
| Soybean-derived peptone | 3 g |
| Potassium monohydrogen phosphate | 2.5 g |
| Grape sugar | 2.5 g |
| Sodium chloride | 5 g |
| Distilled water | 1000 mL |
| pH 7 after sterilization | 1 to 7.5 |

3. Sample Bacteria and Method for Attaching Bacteria to Container
(1) Sample bacteria:
*Bacillus subtilis* var.niger IF013721
(2) Method for attaching bacteria: The sample bacteria were cultured for 7 days at 37° C. on a culture formulated as a spore-forming culture in the usual agar-agar culture. Upon spore formation, the bacteria were collected in a sterilized phosphoric acid buffer solution and heat treatment was conducted for 10 min at 80° C. to remove miscellaneous bacteria other than the object bacteria. A suspension was then obtained by cooling. The number of bacteria in the suspension was measured by diluted cultivation in a standard agar-agar culture, and the suspension was caused to adhere to the cup surface with an atomizer so as to obtain $10^6$ cfu/cup, followed by drying. In the case of the lid material, the suspension was caused to adhere in a central zone with a diameter of 75 mm within a punching zone with a diameter of 82 mm, in the same manner as in the above-described method.

4. Test Method

The aseptic filling apparatus was environment sterilized, then the cup and lid material fabricated by the method (2) were introduced into the aseptic filling apparatus maintained in an aseptic state under a positive pressure, a SCD culture was charged in an amount of 200 mL under the predetermined production conditions, and the lid material was heat sealed. The cup product was stored for 7 days at 30° C. under visual observation and then the presence or absence of turbidity and flocculation in the culture were evaluated.

(Production Conditions)
(1) Container sterilization agent: peracetic acid-based sterilization agent (concentration of contained peracetic acid 2500 ppm).
(2) Container surface temperature while sterilization: 65° C.
(3) Container processing time: 10 sec.
(4) Environment sterilization: peracetic acid-based sterilization agent (concentration of contained peracetic acid 2500 ppm), 50° C.×10 min.
(5) Air pressure in each chamber in the aseptic filling apparatus was controlled so that the following conditions were satisfied:

$P_{0-1}=21$ Pa, $P_{0-2}=16$ Pa, $P_1=10$ Pa, $P_2=5$ Pa, $P_3=0$ Pa (atmospheric pressure), $P_5=5$ Pa, $P_6=-1$ Pa.

(6) Sterilization conditions before loading the culture (SCD culture) for filling: 135° C.×60 sec. (F0=24.5).

5. Test Results
(1) Initial number of attached bacteria:
  Cup: $4.5\times10^6$ cfu/cup.
  Lid material: $4.5\times10^6$ cfu/lid material.
(2) Number of tests: n=30 (10 rows×3)
(3) Test results Turbidity and flocculation were formed in the culture of none of the prepared samples. The above-described test results clearly indicated that with the present examples, in a state where SCD culture that can easily become spoiled is charged and sealed, the formation of turbidity or flocculation was observed in none of the samples after storage for 7 days in the environment at a temperature of 30° C. that is higher than normal temperature. Therefore, it was confirmed that a sufficient quality can be guaranteed even in distribution at a normal temperature for the beverage sealed in a cup-shaped container that was obtained with the aseptic filling method and apparatus in accordance with the present invention.

INDUSTRIAL APPLICABILITY

The present invention is not limited to aseptic filling and can be also applied to chilled filling and hot packing, but it is especially useful in aseptic filling systems for cup-shaped containers in which the inversion mechanism easily becomes difficult. Because the container is sterilized and washed in an inverted state, a high sterilization effect can be obtained and the sterilization agent can be reliably removed by washing. The external air can be effectively prevented from flowing into the aseptic chamber, and the air present in the effective chamber can be effectively prevented from flowing to the outside. Moreover, reliable inversion is possible without employing a complex mechanism and the entire process is performed in the same aseptic chamber. Therefore, instability caused by the air flow created by the difference in pressure is avoided. Therefore, the utility of the present invention in application to lightweight synthetic resin containers is high and the present invention can be used for aseptic filling of various containers. Furthermore, the present invention can be used for the manufacture of beverages sealed in cup-shaped containers that can be distributed at normal temperature even when the contents is easily spoiled.

The invention claimed is:

1. A sterilizing and filling apparatus for a cup-shaped container, comprising:
a first conveyor for conveying the cup-shaped container in an inverted state; and
a second conveyor for conveying the cup-shaped container fitted in an upright state, the second conveyor being disposed in downstream of the first conveyor in series with the first conveyor in substantially the same plane inside an integrated chamber;
a container supply device;
a container sterilization device; and
a container washing device, wherein the container supply device, the container sterilization device and container washing device are disposed successively along the first conveyor, thereby forming a container supply zone, a container sterilization zone, and a container washing zone in recited order from the upstream side,
a content filling device,
a lid material sealing device, and
a device for discharging the sealed cup-shaped container, wherein the content filling device, the lid material sealing device, and the device for discharging the sealed cup-shaped container are installed successively along the second conveyor, thereby forming a content filling zone, a lid material sealing zone, and a sealed container discharge zone in recited order from the upstream side,
wherein the first conveyor has a receiving stand for receiving the container in an inverted state, the second conveyor is a conveyor having a container receiving stand having formed therein a container fitting port for receiving the container in an upright state, and the container is transferred in a turned-over state to the second conveyor by transferring the container between the first conveyor and the second conveyor in a state where the container is turned sidewise in the end section on the downstream side of the first conveyor and transferred to the container fitting port on the upstream side of the second conveyor
wherein the integrated chamber is partitioned into a sterilization-washing zone and a filling-sealing zone with a partition wall having an opening through which the container passes in a transition site between the first conveyor and second conveyor, and the air pressure of the filling-sealing zone is higher than the air pressure of the sterilization-washing zone.

2. The sterilizing and filling apparatus for a cup-shaped container according to claim 1, wherein the chamber is an aseptic chamber inside which a positive pressure is created with aseptic air, has a supply port for the cup-shaped container, a discharge port for the filled and sealed cup-shaped container, a supply port for a lid material, and a discharge port for a lid material skeleton, and also has a supply port for aseptic air and a main air discharge port, and characterized in that the upstream side of the container supply zone inside the aseptic chamber is partitioned by a partition wall having a passage port through which the first conveyor passes, whereby a preliminary pressure zone is formed, and the main discharge port is formed in the preliminary pressure zone, while allowing the circulation of air.

3. The sterilizing and filling apparatus for a cup-shaped container according to claim 1 or 2, wherein the container sterilization zone and the container washing zone are partitioned with partition means that allows the air to circulate therethrough and prevents the circulation of liquid in the predetermined direction, and a sterilization liquid or washing liquid flying in the container sterilization zone and container washing zone is prevented from scattering to other zones.

4. The sterilizing and filling apparatus for a cup-shaped container according to claim 3, wherein the partition means is a blind-shaped partition in which inclined plates that are inclined downward toward the respective zone are disposed with a predetermined spacing.

5. The sterilizing and filling apparatus for a cup-shaped container according to claim 1 or 2, wherein the container supply device comprises a container supply chamber formed in an upper wall of the aseptic chamber, a container supply stacker disposed at the upper wall of the container supply chamber, and a container supply rotor that is disposed in the container supply chamber, receives the container from the container stacker and turns the container over, and supplies the container on the first conveyor located inside the aseptic chamber, and characterized in that the container supply rotor comprises one or a plurality of container fitting pockets in an outer peripheral section of a cylindrical rotor and the outer peripheral surface thereof is disposed so as be in circumferential contact with an upper open section of the container supply chamber and an opening edge of the container supply port of the aseptic chamber, whereby the air inside the aseptic chamber is prevented from flowing out from the container supply port.

6. The sterilizing and filling apparatus for a cup-shaped container according to claim 1 or 2, wherein the lid material sterilization zone and lid material washing zone are connected to the chamber, the lid material sterilization zone and lid material washing zone are partitioned by a partition wall having the lid material passage holes formed therein, and each zone can be controlled to an air pressure different from the air pressure inside the aseptic chamber.

7. The sterilizing and filling apparatus for a cup-shaped container according to claim 1, wherein the reception stand of the first conveyor has an opening section for being inserted with a flange of the cup-shaped container, has a plurality of protrusions that protrude in the radial direction for supporting the flange of the container inside the opening section, and has at least one support pin that extends in the height direction of the container to support the container when the container is turned sidewise.

8. The sterilizing and filling apparatus for a cup-shaped container according to claim 1 or 2, wherein a container discharge pressure regulation chamber is provided at the upper wall of the aseptic chamber in the vicinity of the downstream end section of the second conveyor, the container discharge pressure regulation chamber and the aseptic chamber are linked via a container discharge port through which the container can pass, and the air pressure inside the container discharge pressure regulation chamber and the aseptic chamber can be regulated independently.

* * * * *